(12) United States Patent
Pang et al.

(10) Patent No.: US 12,314,625 B2
(45) Date of Patent: May 27, 2025

(54) SYSTEMS AND METHODS OF CONTROLLING DOCKING FOR GRAPHIC DISPLAYS WITHIN A MULTI-DISPLAY HMI ENVIRONMENT FOR INDUSTRIAL SYSTEMS

(71) Applicant: ROCKWELL AUTOMATION TECHNOLOGIES, INC., Mayfield Heights, OH (US)

(72) Inventors: Yanqing Pang, Dalian (CN); Yan Wang, Dalian (CN); Rong Sheng, Dalian (CN); Shaolong Teng, Dalian (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/462,037

(22) Filed: Sep. 6, 2023

(65) Prior Publication Data

US 2025/0077159 A1 Mar. 6, 2025

(51) Int. Cl.
*G06F 3/14* (2006.01)
*G06F 3/0482* (2013.01)

(52) U.S. Cl.
CPC .......... *G06F 3/1446* (2013.01); *G06F 3/0482* (2013.01)

(58) Field of Classification Search
CPC .............................. G06F 3/1446; G06F 3/0482
See application file for complete search history.

(56) References Cited

U.S. PATENT DOCUMENTS

| | | | |
|---|---|---|---|
| 2011/0164065 A1* | 7/2011 | Mate .................... | G06F 3/1446 345/1.3 |
| 2022/0164156 A1* | 5/2022 | Fitzgerald ........... | H04N 23/698 |

* cited by examiner

*Primary Examiner* — David D Davis
(74) *Attorney, Agent, or Firm* — Quarles & Brady LLP

(57) ABSTRACT

Systems and methods of controlling graphic displays within a multi-display human machine interface ("HMI") environment for industrial systems. One system includes an electronic processor configured to determine a display parameter for a header portion of a graphic display of the plurality of graphic displays. The electronic processor may be configured to determine, based on the display parameter, an arrangement for the graphic display, where the arrangement maintains the header portion of the graphic display within a display frame for the graphic display. The electronic processor may be configured to generate the graphic display based on the arrangement. The electronic processor may be configured to display the HMI-client application across the plurality of display devices and display the graphic display within the display frame for the graphic display on a first display device of the plurality of display devices.

20 Claims, 11 Drawing Sheets

SYSTEMS AND METHODS OF CONTROLLING DOCKING FOR GRAPHIC DISPLAYS WITHIN A MULTI-DISPLAY HMI ENVIRONMENT FOR INDUSTRIAL SYSTEMS

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

The technology disclosed herein relates generally to industrial systems, and, more particularly, to controlling header docking for graphic displays within a multi-display human machine interface ("HMI") environment for industrial systems.

Human-machine interface ("HMI") software generally enables interaction between an industrial system and a user, such as, e.g., for process monitoring and supervisory control for the industrial system. In some instances, HMI software may be provided to and interacted with by a user from a control room having, e.g., a user device and one or more display devices (e.g., as a multi-display HMI environment). In some examples, the multi-display HMI environment may include multiple display devices connected (or otherwise linked) to a single workstation, such that the multiple display devices may emulate a single large or oversized display device (e.g., an HMI-client frame). Alternatively, or in addition, in some examples, the multi-display HMI environment may include a single display device, where a display area of the single display device is divided or segmented into smaller display areas. For example, for a display device having an ultra-high-definition ("UHD") resolution (e.g., 4K, 3840×2160), the display device may be divided into smaller display areas (e.g., four display areas with 1920×1080 resolution in pixels).

For example, HMI software may provide a graphical user interface ("GUI") of a dashboard with operation information and input/output controls for operating, controlling, and monitoring an industrial system (or equipment included therein). In some instances, the HMI software may provide information associated with the industrial system via one or more graphic displays. A graphic display may also be referred to herein as a graphic display screen, window, or user interface. A graphic display may represent, e.g., a runtime operator's view of a plant or facility activity, including activity of one or more industrial systems included therein. When interacting with a multi-display HMI environment, the HMI software may enable the display of one or more graphic displays, where each graphic display may be provided or displayed within a display frame (or a display area or portion thereof) of a corresponding display device (e.g., a portion of a display area of a single display device, a display area of one display device of the display devices included in the multi-monitor environment, etc.).

Accordingly, in some instances, a user may launch the HMI software such that the HMI software is displayed within an HMI-client frame. The HMI software may be displayed via one or more user interfaces (e.g., a graphical user interface ("GUI")), windows, screens, etc. In some instances, the HMI software may be displayed via one or more graphic display windows. The HMI-client frame may include a display area of the multi-display HMI environment (e.g., a total display area provided by the one or more display devices). For example, when the multi-display HMI environment includes two display devices, the HMI-client frame may include the display area of the first display device and the display area of the second display device. The HMI-client frame may be divided or segmented into a plurality of graphic display frames. A graphic display frame may define a border or boundary of a display region included within the HMI-client frame. For example, the graphic display frame may include a display area of a display device included in the multi-display HMI environment. As another example, the graphic display frame may include a portion of the display area of a display device included in the multi-display HMI environment.

For instance, in some configurations, a user may launch a single instance of the HMI software, where the single instance of the HMI software is displayed (via, e.g., one or more GUIs, windows, screens, etc.) within an HMI-client frame and each graphic display window for that single instance is displayed within a corresponding graphic display frame of the HMI-client frame. Accordingly, a user may open and view multiple graphic display windows simultaneously across multiple display areas or devices, where each graphic display may be launched (or displayed) within a specific graphic display frame.

As part of interacting with (or viewing) the graphic displays, a user may choose to dock a header portion of the display graphic window, such as, e.g., a menu or navigation bar of the display graphic window. However, when using some HMI software within a multi-display HMI environment, docking of the header portion of the display graphic window may result in the header portion being docked (or otherwise positioned) across multiple display areas (e.g., across multiple graphic display frames). For instance, the HMI software may dock the header portion of the graphic display window with respect to the HMI-client frame.

Further, some HMI software may not facilitate automated arrangement and sizing of multi-display HMI environments. For example, when some HMI software is implemented within a multi-display HMI environment, a user configures setting(s) for the multi-display HMI environment, such as, e.g., a display device size (e.g., in pixels), a display device arrangement or layout, etc. For example, the user may manually specify a size for each display device based on a particular layout. Accordingly, when an arrangement of the multi-display HMI environment changes (e.g., a display device layout changes from a two-by-two display device layout to a one-by-three display device layout), the settings for the multi-display HMI environment may be manually updated by the user.

Accordingly, some approaches to docking header portions in a multi-display HMI environment may result in technical challenges and adverse impacts to the effectiveness of HMI software. For instance, such approaches to docking header portions may adversely impact HMI software performance and user experience by introducing inefficiencies, confusion, etc. For example, when a header portion is docked across multiple display devices, a user may struggle to readily determine which graphic display window the header portion is associated with. As another example, when a header portion is docked across multiple display devices, the distance between a graphic display window and the docked header portion (or an interactive element thereof) may introduce inefficiencies. Additionally, such approaches to docking header portions may introduce user friction with respect to arranging a header portion horizontally or vertically.

To solve these and other technical problems associated with some approaches to docking header portions in a multi-display HMI environment, the technology disclosed herein provide technical solutions that advantageously improve performance, efficiency, and user experience. The technology disclosed herein may include methods and systems that provide a software framework to support multi-display docking such that user experience is enhanced, and user efficiency is increased. For instance, the technology disclosed herein may enable multi-display docking such that a header portion of a graphic display window may be docked with respect to a display frame as opposed to an HMI-client frame. Additionally, the technology disclosed herein may enable horizontally or vertically docking of a header portion within a corresponding graphic display window frame (e.g., within a corresponding display device).

The technology disclosed herein provides systems and methods of controlling graphic displays within a multi-display human machine interface ("HMI") environment for industrial systems. One configuration provides a system of controlling graphic displays within a multi-display HMI environment for industrial systems. The system may include a plurality of display devices configured to provide, within the multi-display HMI environment, an HMI-client application configured to provide a plurality of graphic display user interfaces for an industrial system. The system may also include one or more electronic processors communicatively coupled to the plurality of display devices. The one or more electronic processors may be configured to receiving operation data of the industrial system. The one or more electronic processors may be configured to execute the HMI-client application for the industrial system. The one or more electronic processors may be configured to determine a first display parameter for a first portion of a first graphic display user interface of the plurality of graphic display user interfaces. The one or more electronic processors may be configured to determine, based on the first display parameter, a first arrangement for the first graphic display user interface within a first display frame for the first graphic display user interface. The one or more electronic processors may be configured to generate, based on the first arrangement, the first graphic display user interface including at least a first portion of the operation data of the industrial system. The one or more electronic processors may be configured to display, via a first display device of the plurality of display devices, the first graphic display user interface within the first display frame.

Another configuration provides a method of controlling graphic displays within a multi-display human machine interface ("HMI") environment for industrial systems. The method may include providing, via a plurality of display devices, the multi-display HMI environment for an HMI-client application. The HMI-client application may include a plurality of graphic display user interfaces for an industrial system. An HMI-client frame for displaying the HMI-client application may include a display area of the plurality of display devices and the HMI-client frame may include a corresponding display frame for each graphic display user interface of the plurality of graphic display user interfaces. The method may include executing, with one or more electronic processors, the HMI-client application for the industrial system within the multi-display HMI environment. The method may include determining, with the one or more electronic processors, an alignment for a control portion of a graphic display user interface of the plurality of graphic display user interfaces of the HMI-client application. The method may include determining, with the one or more electronic processors, an arrangement for the graphic display user interface based on the alignment. The arrangement may maintain the control portion of the graphic display user interface at a fixed position within a display frame for the graphic display user interface. The method may include generating, with the one or more electronic processors, the graphic display user interface based on the arrangement. The method may include transmitting, with the one or more electronic processors, the graphic display user interface for display via a first display device included in the plurality of display devices. The graphic display user interface may include an interactive representation of data for the industrial system.

Yet another configuration provides a non-transitory, computer-readable medium storing instructions that, when executed by an electronic processor, perform a set of functions. The set of functions may include executing, within a multi-display HMI environment including a plurality of display devices, an HMI-client application for an industrial system. The HMI-client application may include a plurality of graphic display user interfaces. An HMI-client frame for displaying the HMI-client application may include a display area of the plurality of display devices and the HMI-client frame may include includes a corresponding display frame for each graphic display user interface of the plurality of graphic display user interfaces. The set of functions may include determining a display parameter for a header portion of a graphic display user interface of the plurality of graphic display user interfaces. The set of functions may include determining, based on the display parameter, an arrangement for the graphic display user interface. The arrangement may maintain the header portion of the graphic display user interface within a display frame for the graphic display user interface. The set of functions may include generating the graphic display user interface based on the arrangement. The set of functions may include displaying the HMI-client application across the plurality of display devices. The set of functions may include displaying the graphic display user interface of the HMI-client application within the display frame for the graphic display user interface on a first display device of the plurality of display devices.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects, and advantages other than those set forth above will become apparent when consideration is given to the following detailed description thereof. Such detailed description makes reference to the following drawings.

DETAILED DESCRIPTION

Figure 1:
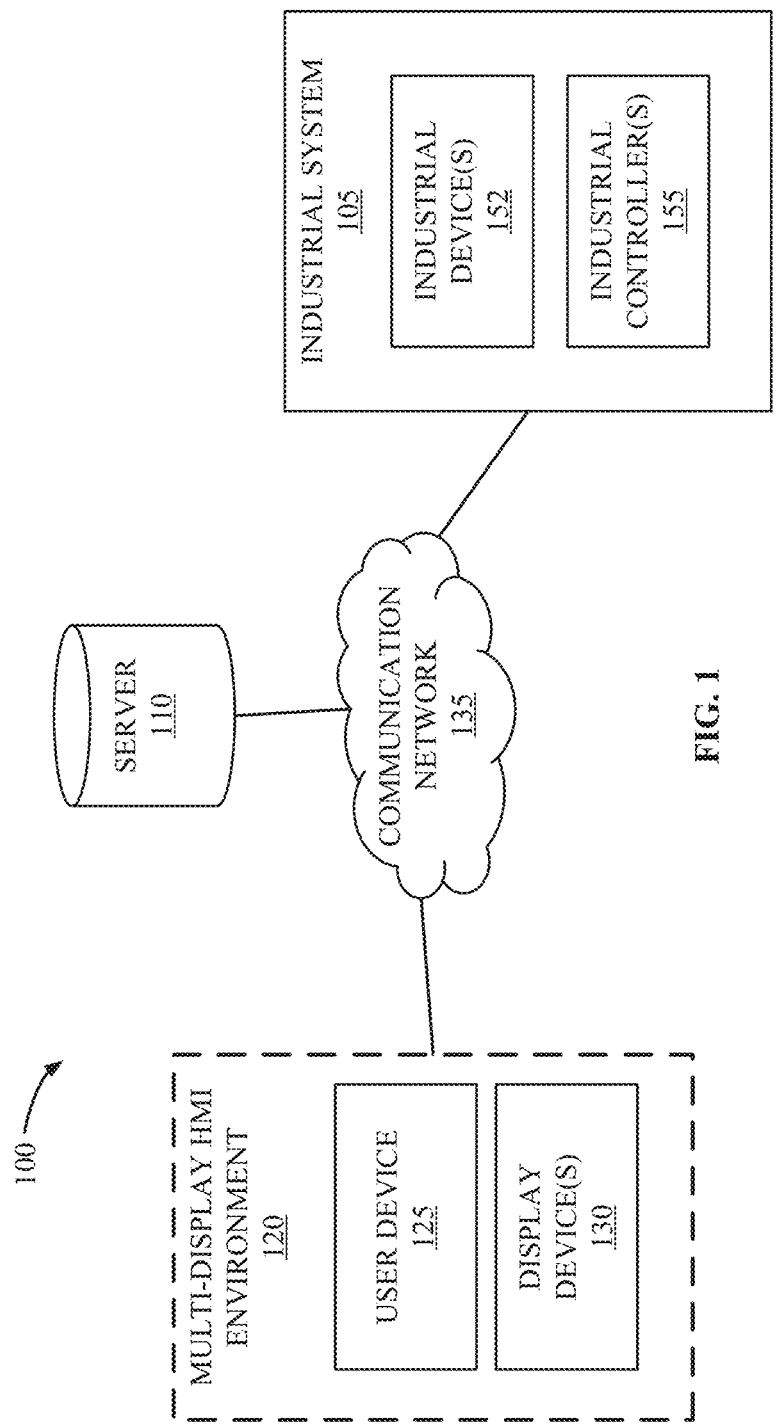
FIG. 1 schematically illustrates a system for controlling graphic displays within a multi-display human machine interface ("HMI") environment for industrial systems according to some configurations.

As utilized herein, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

FIG. 1 schematically illustrates a system 100 for controlling graphic displays within a multi-display human machine interface ("HMI") environment for industrial systems according to some configurations. In the illustrated example, the system 100 may include an industrial system 105, a server 110, and a multi-display HMI environment 120, which may include a user device 125 and a set of display devices 130 (collectively referred to herein as "the display devices 130" and individually as "the display device 130"). In some embodiments, the system 100 includes fewer, additional, or different components in different configurations than illustrated in FIG. 1. As one example, the system 100 may include multiple industrial systems 105, multiple servers 110, multiple multi-display HMI environments 120, multiple user devices 125, or a combination thereof. As another example, one or more components of the system 100 may be combined into a single device, such as, e.g., the user device 125 and the server 110 or one or more of the display devices 130 and the user device 125. Alternatively, or in addition, in some configurations, the user device 125, the server 110, the display device(s) 130, or a combination thereof may be included as part of the industrial system 105 (e.g., as a component of the industrial system 105).

The industrial system 105, the multi-display HMI environment 120 (including the user device 125 and the display device(s) 130), and the server 110 may communicate over one or more wired or wireless communication networks 135. Portions of the communication networks 135 may be implemented using a wide area network, such as the Internet, a local area network, such as BLUETOOTH® or WI-FI®, and combinations or derivatives thereof. Alternatively, or in addition, in some configurations, components of the system 100 may communicate directly as compared to through the communication network 135. Also, in some configurations, the components of the system 100 may communicate through one or more intermediary devices not illustrated in FIG. 1.

The industrial system 105 may be a manufacturing system, such as, e.g., an industrial automation system or the like. The industrial system 105 may be associated with (or located at) a facility or site. In some configurations, a facility or site may be associated with multiple industrial systems 105 (e.g., a first industrial system, a second industrial system, a third industrial system, etc.). Alternatively, or in addition, in some configurations, the system 100 may include a first industrial system located at a first facility and a second industrial system located as a second facility different from the first facility.

The industrial system 105 may be configured to perform one or more industrial processes, manufacturing processes, production processes, or the like. In some configurations, the industrial system 105 may perform a production method that produces goods or products. As one example, the industrial system 105 may perform a vehicle manufacturing processor to assemble or produce a vehicle (or various components thereof). As another example, the industrial system 105 may perform a food manufacturing process for making a food product. As yet another example, the industrial system 105 may perform a pharmaceutical manufacturing process for producing pharmaceuticals.

In the illustrated example, the industrial system 105 may include one or more industrial devices 152 (referred to herein collectively as "the industrial devices 152" and individually as "the industrial device 152") and one or more industrial controllers 155 (referred to herein collectively as "the industrial controllers 155" and individually as "the industrial controller 155"). The industrial device 152, the industrial controller 155, or a combination thereof may be a physical piece of equipment included in the industrial system 105. For example, an industrial device 152 may include a pump, a press, a conveyor, a valve, a switch, a sensor, a server, a database, a human-machine interface ("HMI"), another piece of equipment that may be used in connection with an associated industrial process or application of the industrial system 105, or the like. The industrial controller 155 may be a programmable logic controller ("PLC") or the like. In some configurations, the industrial controller 155 may be communicatively coupled to at least one industrial device 152 included in the industrial system 105 such that the industrial controller 155 may control an operation or functionality associated with the at least one industrial device 152 included in the industrial system 105.

Figure 2:
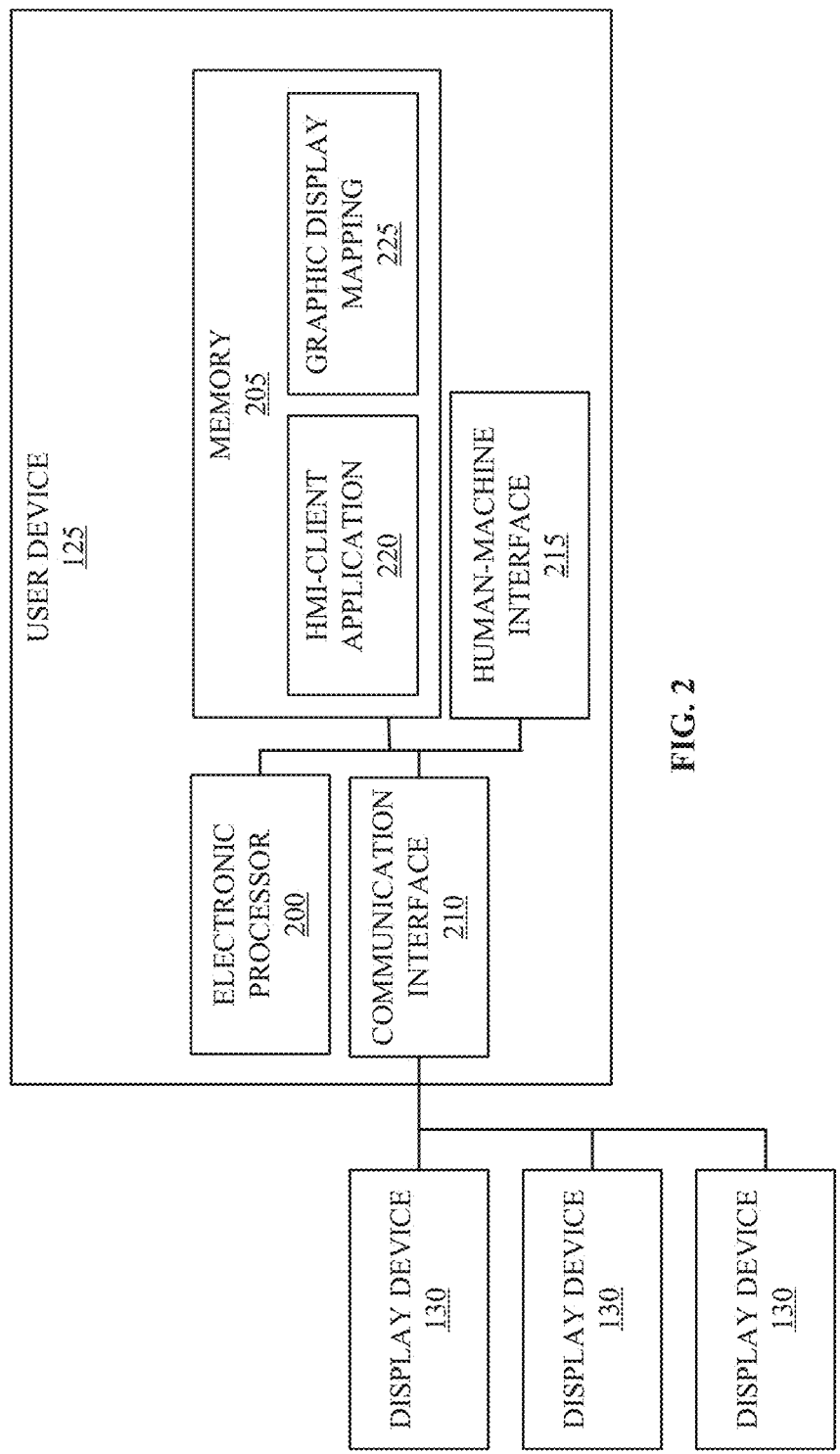
FIG. 2 schematically illustrates a user device included in the system of FIG. 1 according to some configurations.

The user device 125 may be a computing device, such as a desktop computer, a laptop computer, a tablet computer, a terminal, a smart telephone, a smart television, a smart wearable, or another suitable computing device that interfaces with a user. As illustrated in FIG. 2, the user device 125 may include an electronic processor 200, a memory 205, and a communication interface 210, and a human-machine interface ("HMI") 215. The electronic processor 200, the memory 205, the communication interface 210, and the HMI 215 may communicate wirelessly, over one or more communication lines or buses, or a combination thereof. The user device 125 may include additional components than those illustrated in FIG. 2 in various configurations. The user device 125 may also perform additional functionality other than the functionality described herein. Also, the functionality (or a portion thereof) described herein as being performed by the user device 125 may be distributed among multiple devices (e.g., as part of a cloud service or cloud-computing environment), combined with another component of the system 100 (e.g., combined with the server 110, another component of the system 100, another remote device, or the like), or a combination thereof.

The communication interface 210 may include a transceiver that communicates with the industrial system 105, the server 110, the display device(s) 130, another component of the multi-display HMI environment 120, or a combination thereof over the communication network 135 and, optionally, one or more other communication networks or connections. In some configurations, the communication interface 210 enables the user device 125 to communicate with the industrial system 105, the server 110, the display device(s) 130, another component of the multi-display HMI environment 120, or a combination thereof over one or more wired or wireless connections. The electronic processor 200 may include a microprocessor, an application-specific integrated circuit ("ASIC"), or another suitable electronic device for processing data, and the memory 205 includes a non-transitory, computer-readable storage medium. The electronic processor 200 is configured to retrieve instructions and data from the memory 205 and execute the instructions.

As one example, as illustrated in FIG. 2, the memory 205 may include an HMI-client application 220 (referred to herein as "the application 220") and a graphic display mapping 225. Although FIG. 2 illustrates the application 220, the graphic display mapping 225, or a combination thereof as being stored in the memory 205, in some configurations, the application 220, the graphic display mapping 225, or a combination thereof may be stored external to the memory 205, such as in one or more remote devices (e.g., the server 110).

The application 220 may be a software application executable by the electronic processor 200 in the example illustrated and as specifically discussed below, although a similarly purposed module may be implemented in other ways in other examples. In some configurations, the application 220 is an HMI software that enables interaction between the industrial system 105 (or components thereof) and a user. Accordingly, in some configurations, the electronic processor 200 may execute the application 220 to provide process monitoring and supervisory control for the industrial system 105 (or component(s) thereof). For instance, the electronic processor 200 may execute the application 220 to provide a graphical user interface ("GUI") of a dashboard with input/output controls for operating, controlling, and monitoring the industrial system 105. The electronic processor 200 may execute the application 220 to provide information related to operation of the industrial system 105, such as, e.g., security and alarms related information, production related information, trend related information, efficiency related information, diagnostic related information, process related information, etc. In some configurations, the electronic processor 200 may execute the application 220 to provide, e.g., diagnostic messages, health monitoring services, and access to real-time (or near real-time) data (e.g., operation data for the industrial system 105).

In some instances, the electronic processor 200 may execute the application 220 to provide information associated with the industrial system 105 via one or more graphic display windows (also referred to herein as graphic displays, graphic display screens, or graphic display user interfaces). For example, as noted herein, HMI software (e.g., the application 220) may provide a GUI that includes a dashboard with operation information and input/output controls for operating, controlling, and monitoring industrial systems (or equipment included therein). In some instances, the application 220 may provide the dashboard via one or more graphic displays (also referred to herein as graphic display windows or graphic display screens). A graphic display window may be a user interface, such as, e.g., a GUI. The graphic display window may provide information associated with the industrial system 105, such as, e.g., productivity related information, performance related information, maintenance related information, production related information, etc. A graphic display window may include one or more graphical objects representing data for the industrial system 105. Alternatively, or in addition, a graphic display window may include text objects representing data for the industrial system 105 (e.g., raw data, processed data, etc.).

Information associated with the industrial system 105 may include information describing an operation performed by the industrial system 105, such as, e.g., a process, a recipe, etc. Alternatively, or in addition, information associated with the industrial system 105 may include information related to the production of a particular product or part (e.g., total parts, good parts, scrap parts, part type, etc.). Alternatively, or in addition, information associated with the industrial system 105 may include information associated with one or more components of the industrial system 105, such as, e.g., one or more industrial devices 152, industrial controllers 155, etc. For example, the information associated with the industrial system 105 may include productivity related information, performance related information, status related information, etc. for a particular component (or group of components) of the industrial system 105.

In some configurations, a graphic display window may be specific to a particular feature or attribute of the industrial system 105 (e.g., provide information associated with that particular feature or attribute). For example, the graphic display may be specific to a process performed by the industrial system 105, a product produced by the industrial system 105, a region or grid of the industrial system 105, etc. For example, the graphic display may be a main screen providing an overview of the industrial system 105, an alarm screen providing alarm related information associated with the industrial system 105 (e.g., an alarm status for one or more components of the industrial system 105, a location of a triggered alarm, etc.), a trend screen that provides trend data associated with the industrial system 105, a data log that provides a read out of data associated with the industrial system 105, a grid control screen that enables a user to interact with or control one or more grids of the industrial system 105, etc. Accordingly, in some configurations, a graphic display window may provide information specific to a particular feature or attribute of the industrial system 105.

Accordingly, in some examples, a graphic display window may represent (or otherwise provide) a runtime operator's view of the industrial system 105 (or component(s) or process(es) thereof). In some configurations, the graphic display window may provide industrial system or process data. Alternatively, or in addition, in some configurations, the graphic display window may enable receipt of user input, such as, e.g., enable an operator to write values to the industrial device(s) 152, the industrial controller(s) 155, etc.

Figure 3:
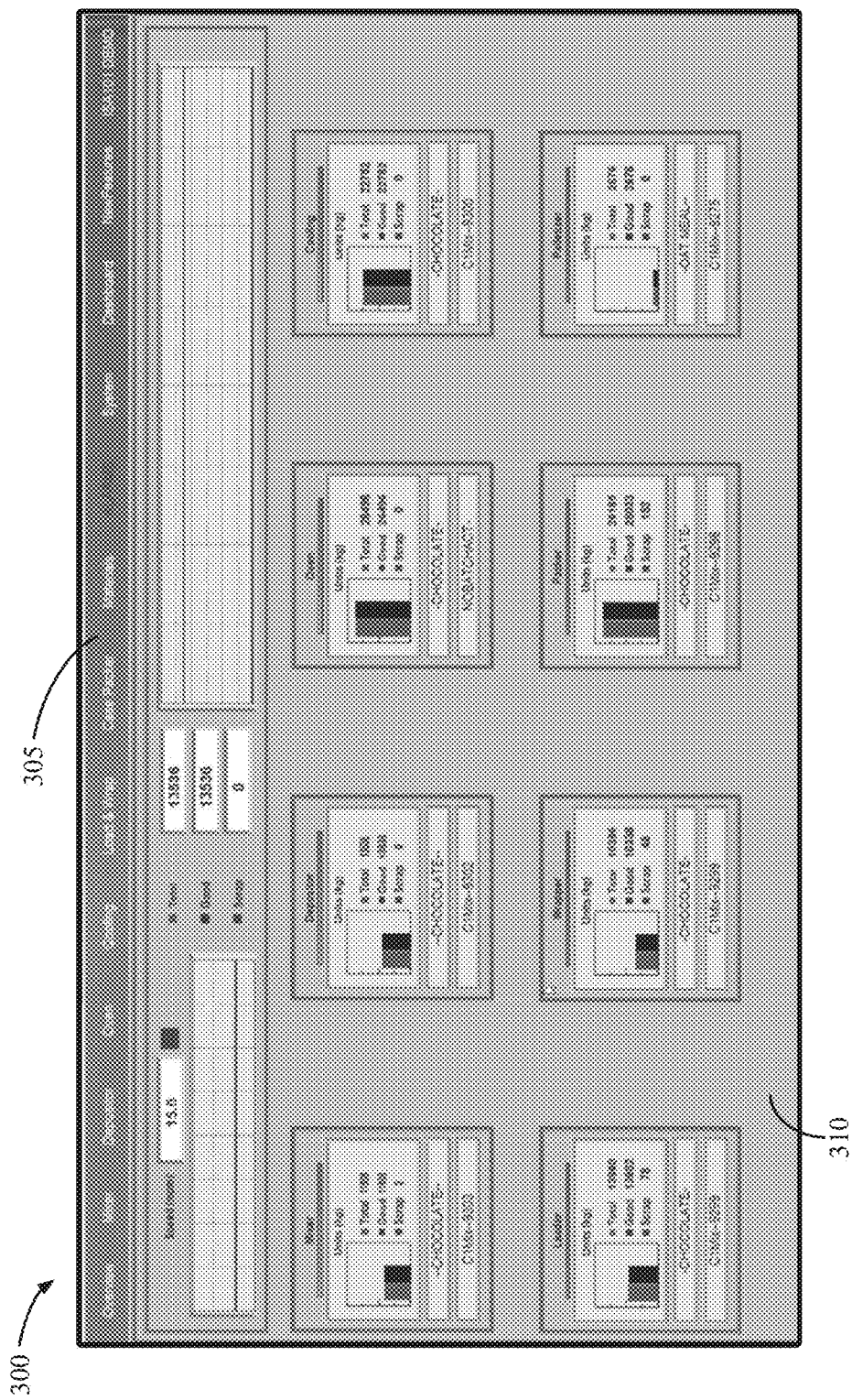
FIG. 3 illustrates an example graphic display window for an industrial system according to some configurations.

FIG. 3 illustrates an example graphic display window 300 for the industrial system 105 according to some configurations. As illustrated in FIG. 3, the graphic display window 300 includes a header portion 305 and a content portion 310. The header portion 305 may be a navigation bar, a menu bar, a command bar, etc. Accordingly, in some configurations, the header portion 305 may include one or more interactive elements or objects. A user may interact with the graphic display window 300 via the interactive elements (e.g., select with a mouse click, etc.). The content portion 310 may include an area of the graphic display window 300 in which content or data of the industrial system 105 related to the graphic display window 300 may be displayed or otherwise provided to a user. The content portion 310 may include one or more graphic objects (e.g., graphs), text objects, etc. that provide information or data related to various components of the industrial system 105 (e.g., the industrial device(s) 152, the industrial controller(s) 155, etc.). In the illustrated example of FIG. 3, the content portion 310 provides information related to the production of a product or material in terms of a total count, a good count, and a scrap count, by component of the industrial system 105 (e.g., a mixer, a depositor, an oven, a cooling component, a loader, a wrapper, a packer, and a palletizer).

Figure 4:
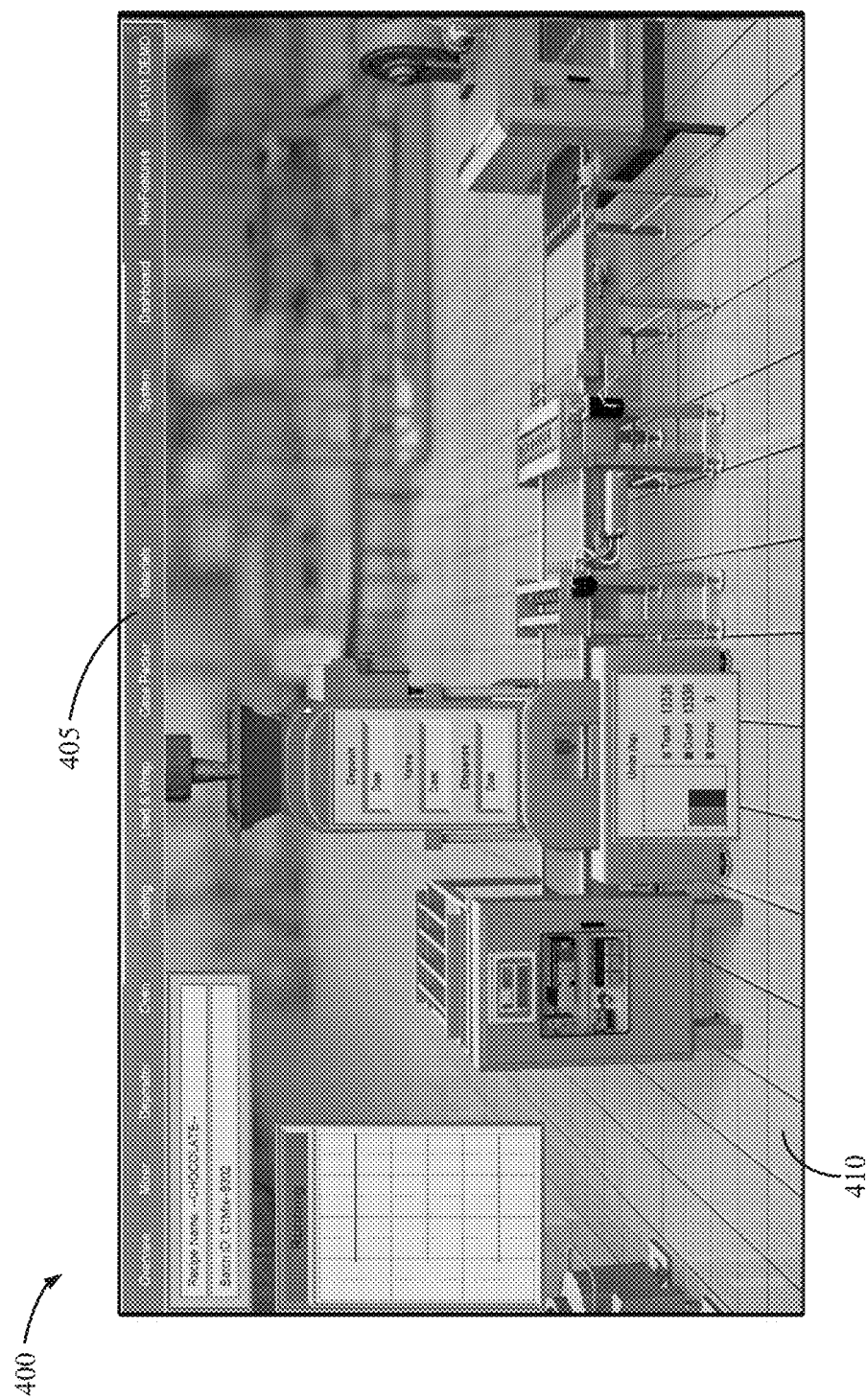
FIG. 4 illustrates another example graphic display window for an industrial system according to some configurations.
Figure 5:
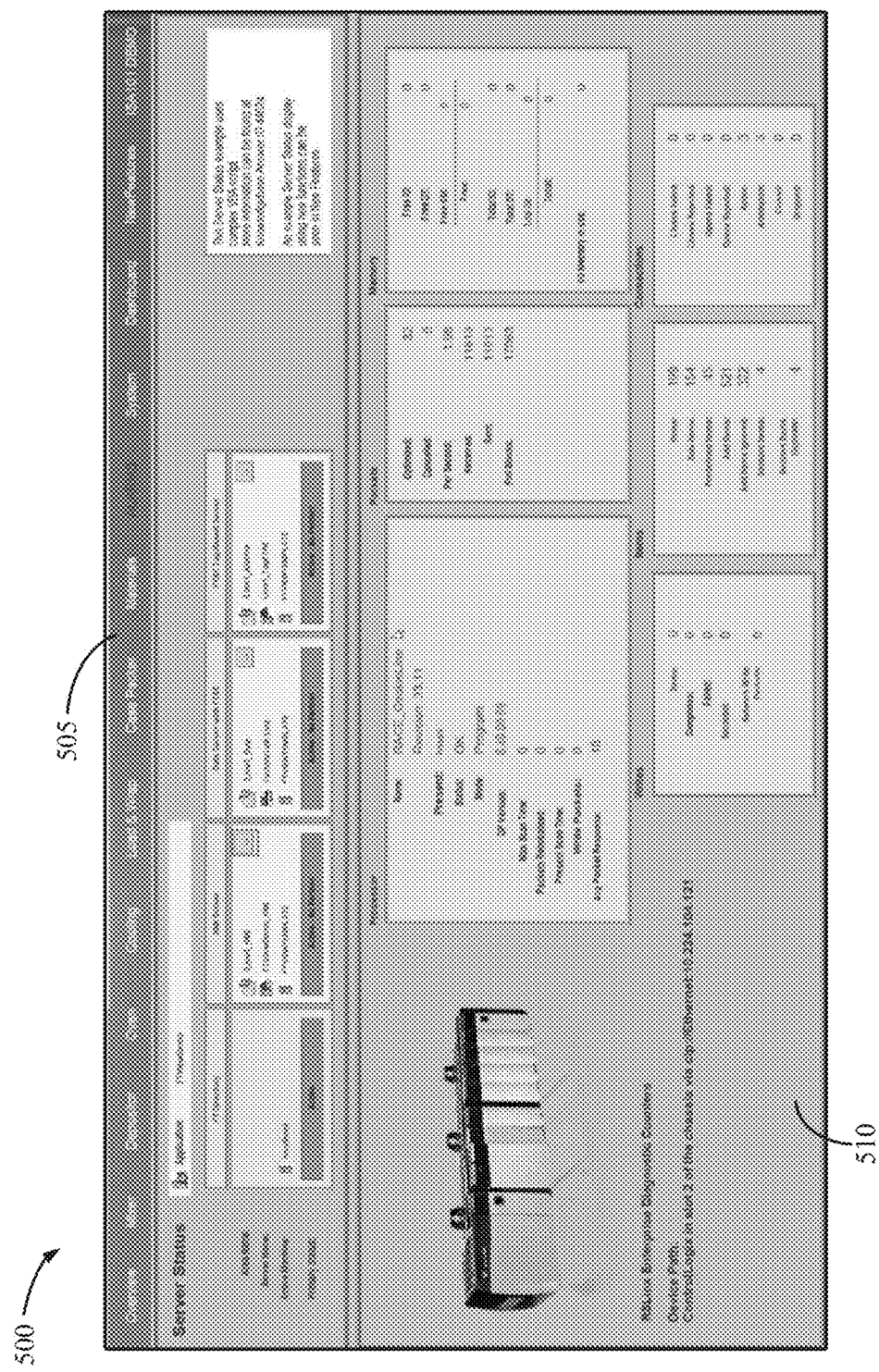
FIG. 5 illustrates another example graphic display window for an industrial system according to some configurations.

FIG. 4 illustrates another example graphic display window 400 for the industrial system 105 according to some configurations. The graphic display window 400 provides information associated with a process (e.g., a recipe). As illustrated in FIG. 4, the graphic display window 400 includes a header portion 405 (e.g., similar to the header portion 305 of FIG. 3) and a content portion 410 (e.g., similar to the content portion 310 of FIG. 3). FIG. 5 illustrates another example graphic display window 500 for the industrial system 105 according to some configurations. The graphic display window 500 provides information associated with a server status. As illustrated in FIG. 5, the graphic display window 500 includes a header portion 505 (e.g., similar to the header portion 305 of FIG. 3) and a content portion 510 (e.g., similar to the content portion 310 of FIG. 3).

As illustrated in FIG. 2, the memory 205 may also include the graphic display mapping 225. The graphic display mapping 225 may include display parameters associated with one or more graphic display windows. For instance, the graphic display mapping 225 may include display parameters for graphic display windows configured by a user (e.g., as described in greater detail herein with respect to FIG. 11). In some configurations, the graphic display mapping 225 includes a list of graphic display windows configured by a user and corresponding display parameters for each graphic display window configured by the user. For example, the graphic display mapping 225 may include a set of associations between graphic display windows and corresponding display parameters (e.g., z-order information, position, etc.). In some configurations, the graphic display mapping 225 includes, for each of the configured display frames, a position (e.g., a position (or display device 130) within the multi-display HMI environment 120), a size (e.g., a resolution or pixel size), etc. In some configurations, the electronic processor 200 may access the graphic display mapping 225 as part of executing the application 220 to, ultimately, generate and provide the graphic display window(s) to an operator or user, as described in greater detail herein.

Returning to FIG. 2, the user device 125 may include the HMI 215 for interacting with a user. The HMI 215 may include one or more input devices, one or more output devices, or a combination thereof. Accordingly, in some configurations, the HMI 215 allows a user to interact with (e.g., provide input to and receive output from) the user device 125. For example, the HMI 215 may include a keyboard, a cursor-control device (e.g., a mouse), a touch screen, a scroll ball, a mechanical button, a display device (e.g., a liquid crystal display ("LCD")), a printer, a speaker, a microphone, another type of input device, another type of output device, or a combination thereof.

As illustrated in FIG. 2, in some configurations, the user device 125 may be communicatively coupled to the display device(s) 130. For instance, when the user device 125 is included within a multi-display HMI environment (e.g., the multi-display HMI environment 120 of FIG. 1), the user device 125 may be in communication with one or more external display devices (e.g., monitors). Alternatively, or in addition, in some configurations, one of the display devices 130 may be included as a display device of the HMI 215. For example, a display device 130 may be included in the same housing as the user device 125 (e.g., as a display screen of the user device 125). Alternatively, or in addition, in some instances, the display devices 130 may communicate with the user device 125 over one or more wired or wireless connections. For example, in some configurations, the display device(s) 130 is a touchscreen included in a laptop computer or a tablet computer (e.g., the user device 125). In other configurations, the display device(s) 130 is a monitor, a television, or a projector coupled to a terminal, a desktop computer, or the like via one or more cables.

Returning to FIG. 1, the system 100 may also include the server 110. The server 110 may be a computing device. Although not illustrated in FIG. 1, the server 110 may include similar components as the user device 125, such as electronic processor (for example, a microprocessor, an ASIC, or another suitable electronic device), a memory (for example, a non-transitory, computer-readable storage medium), a communication interface, such as a transceiver, for communicating over the communication network 135 and, optionally, one or more additional communication networks or connections, and one or more HMIs. For example, to communicate with the user device 125, the server 110 may store a browser application or a dedicated software application executable by an electronic processor. The server 110 may host or otherwise provide at least one industrial system service or platform (e.g., a process monitoring and supervisory control service). Accordingly, in some configurations, the server 110 is associated with an industrial system service (e.g., included as a component, device, or subsystem of a system providing or hosting an industrial system service). Alternatively, or in addition, in some configurations, the functionality described herein as being performed by the user device 125 may be locally performed by the server 110. For example, in some configurations, the server 110 may store the application 220.

Figure 6:
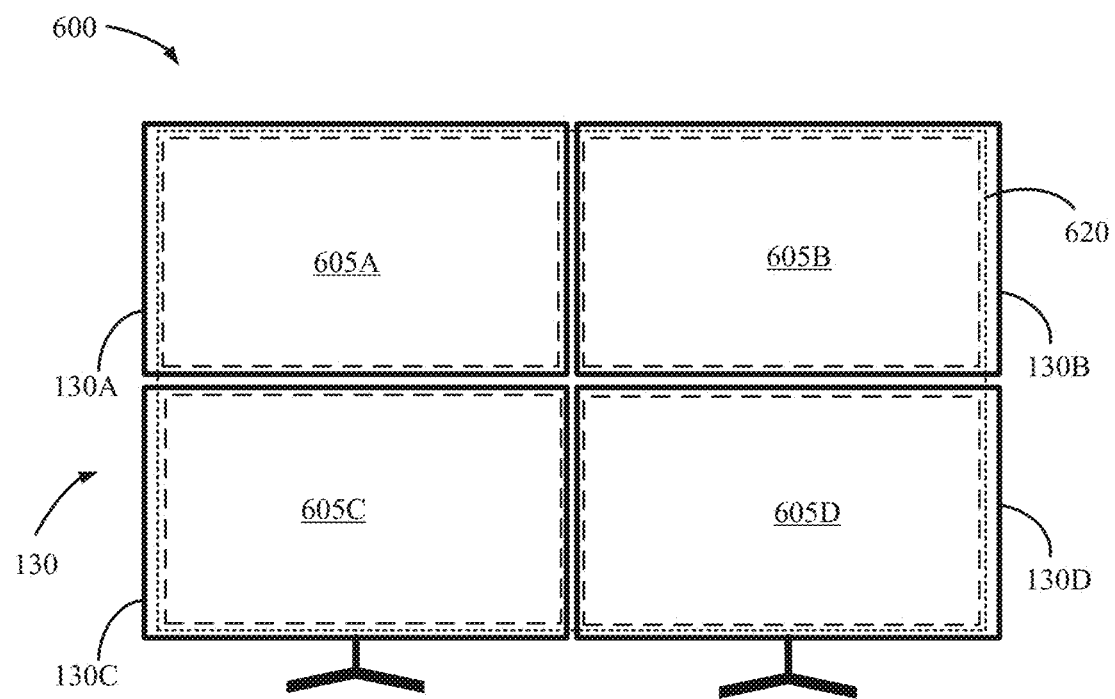
FIG. 6 illustrates an example multi-display HMI environment according to some configurations.

As noted herein, the user device 125 and the display devices 130 may be included in the multi-display HMI environment 120. FIG. 6 illustrates an example arrangement or layout of a multi-display HMI environment 600 (e.g., the multi-display HMI environment 120 of FIG. 1). As illustrated in FIG. 6, the multi-display HMI environment 600 includes four display devices 130 (represented in FIG. 6 as a first display device 130A, a second display device 130B, a third display device 130C, and a fourth display device 130D), where the display devices 130 are arranged in a two-by-two configuration. Each of the display devices 130 may include a display area (e.g., an area for displaying content to a user). The display area of the display device(s) 130 may be defined by a display frame (e.g., a border or boundary of a corresponding display area). For example, as illustrated in FIG. 6, the first display device 130A includes a first display frame 605A, the second display device 130B includes a second display frame 605B, the third display device 130C includes a third display frame 605C, and the fourth display device 130D includes a fourth display frame 605D. As also illustrated in FIG. 6, the multi-display environment 120 may provide an HMI-client frame 620 (generally represented in FIG. 6 as a dashed line). The HMI-client frame 620 represents a display area (or total display area) for the application 220 (e.g., the HMI software or client application). As illustrated in FIG. 6, the HMI-client frame 620 includes the display areas of the display devices 130. For instance, as illustrated in FIG. 6, the HMI-client frame 620 includes the first display frame 605A, the second display frame 605B, the third display frame 605C, and the fourth display frame 605D. Accordingly, in some configurations, the HMI-client frame 620 may be divided or segmented into sub-frames (e.g., the display frames 605A-D).

Figure 7:
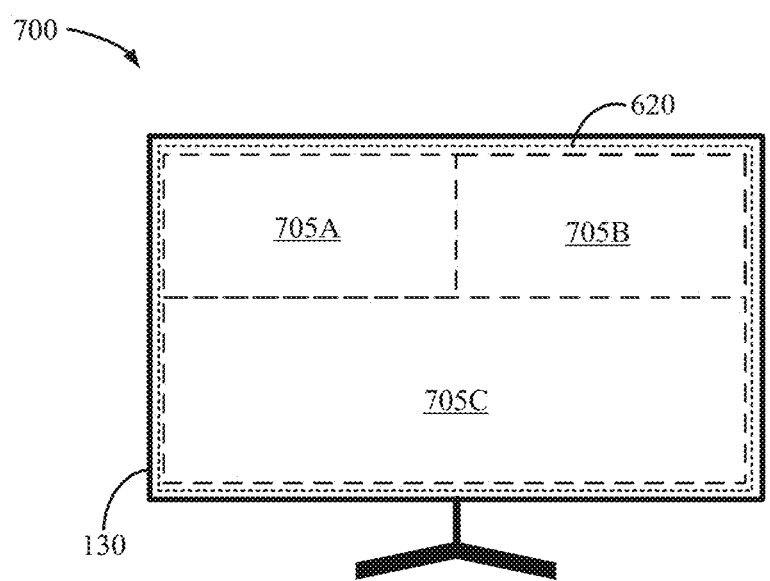
FIG. 7 illustrates another example multi-display HMI environment according to some configurations.

In some configurations, a display frame may define a portion of a display area for a display device 130. For example, FIG. 7 illustrates another example multi-display HMI environment 700 (e.g., the multi-display HMI environment 120) according to some configurations. As illustrated in FIG. 7, the multi-display HMI environment 700 includes a single display device (e.g., the display device 130) that includes the HMI-client frame 620. The display device 130 may include a plurality of display frames 705 (e.g., a first display frame 705A, a second display frame 705B, and a third display frame 705C). As illustrated in FIG. 7, in some configurations, the HMI-client frame 620 may include display frames of different sizes or shapes. Alternatively, as illustrated in FIG. 6, the HMI-client frame 620 may include display frames that are the same (or substantially similar) in size or shape.

Figure 8:
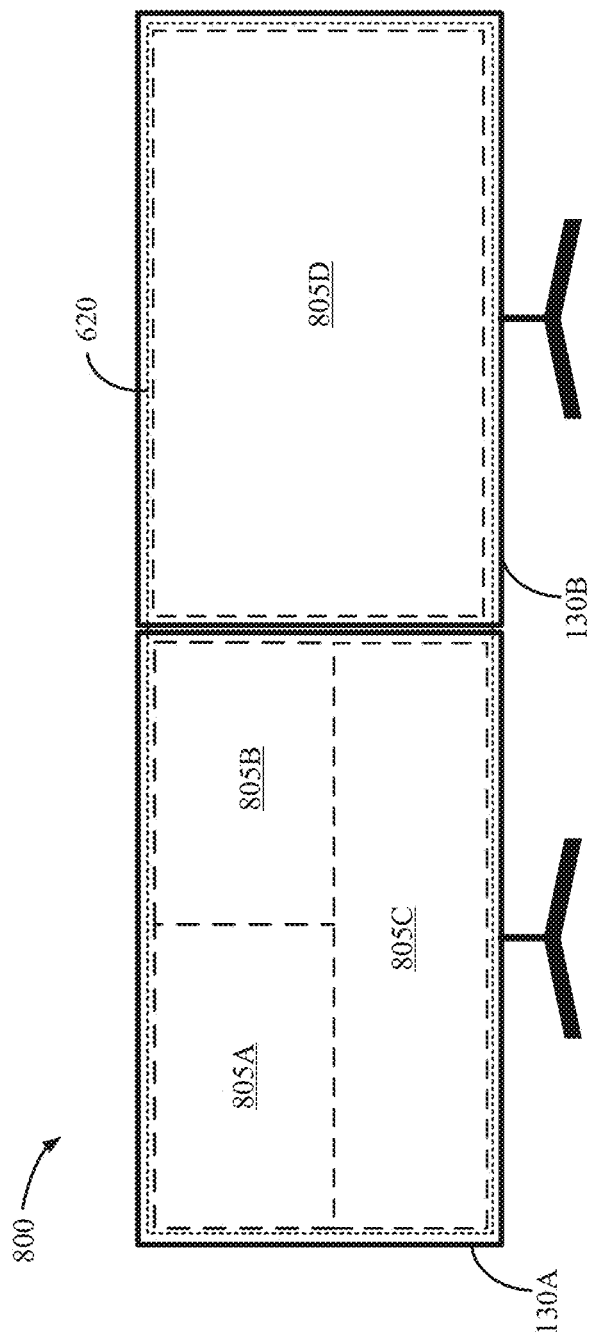
FIG. 8 illustrates another example multi-display HMI environment according to some configurations.

FIG. 8 illustrates another example multi-display HMI environment 800 (e.g., the multi-display HMI environment 700) according to some configurations. As illustrated in FIG. 8, the multi-display HMI environment 800 may include two display devices 130 (e.g., a first display device 130A and a second display device 130B). The HMI-client frame 620 extends across the first display device 130A and the second display device 130B. As illustrated in FIG. 8, the first display device 130A includes a set of display frames 805 (e.g., a first display frame 805A, a second display frame 805B, and a third display frame 805C) and the second display device 130B includes a single display frame 805 (e.g., a fourth display frame 805D). Accordingly, as illustrated by the example of FIG. 8, in some configurations, each display device 130 may be associated with or include a different number of display frames.

Figure 9:
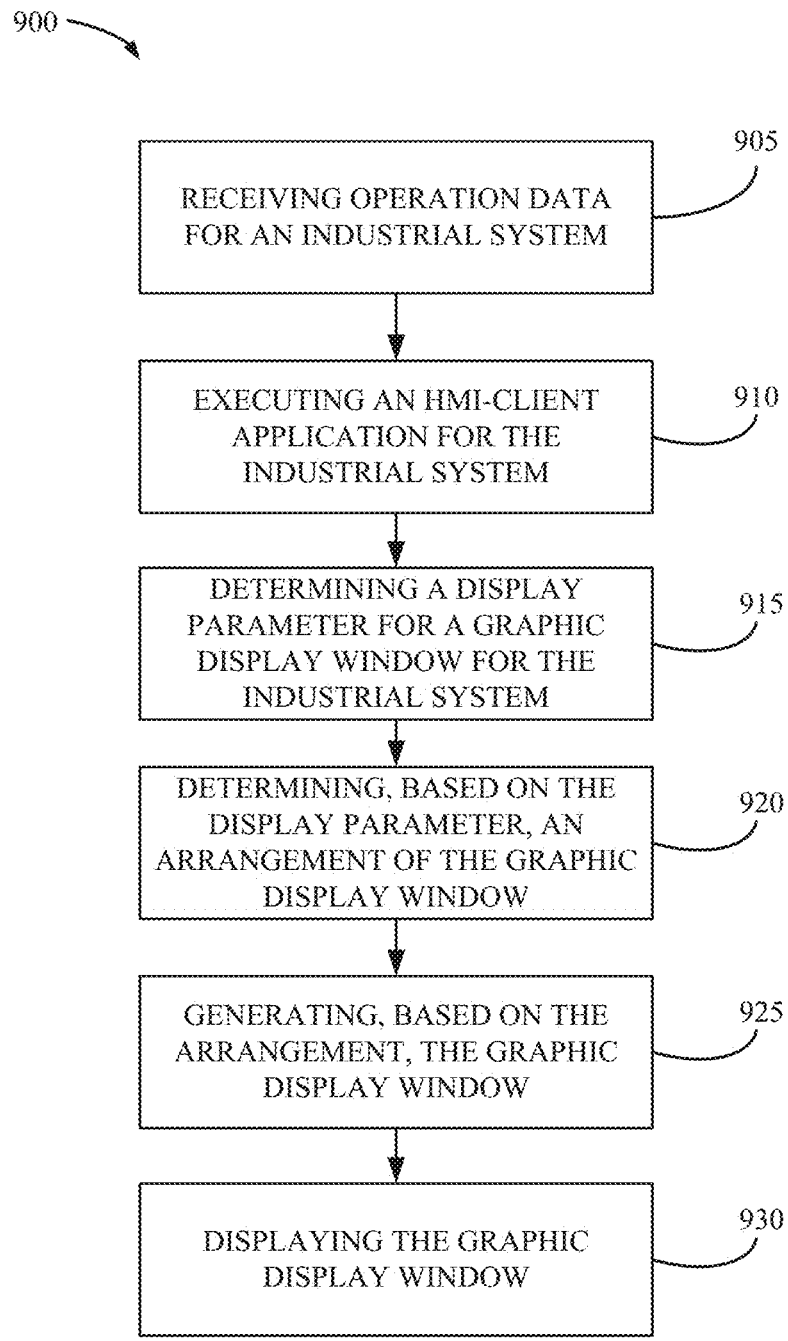
FIG. 9 is a flowchart illustrating a method for controlling graphic displays within a multi-display human machine interface ("HMI") environment for industrial systems according to some configurations.

FIG. 9 is a flowchart illustrating a method 900 of controlling graphic displays within a multi-display HMI environment (e.g., the multi-display HMI environment 120) for industrial systems according to some configurations. The method 900 is described as being performed by the user device 125 and, in particular, the electronic processor 200. However, as noted herein, the functionality described with respect to the method 900 may be performed by other devices, such as the server 110, a component included in the industrial system 105, or a combination thereof, distributed among a plurality of devices, such as a plurality of servers included in a cloud service, or a combination thereof.

As illustrated in FIG. 9, the method 900 may include receiving operation data for the industrial system 105 (at block 905). Operation data of the industrial system 105 may include information or data related to operation of the industrial system 105 (or component(s) included therein). For instance, operation data may include, e.g., security and alarms related information, production related information, trend related information, efficiency related information, diagnostic related information, process related information, etc.

The electronic processor 200 may receive the operation data directly from the industrial system 105 (or component(s) included therein), such as, e.g., via the communication network(s) 135. Alternatively, or in addition, the electronic processor 200 may receive the operation data indirectly from the industrial system 105 (or component(s) included therein) via one or more intermediate devices through the communication network(s) 135. In some configurations, the electronic processor 200 may receive the operation data in real-time (or near real-time) (e.g., during operation of the industrial system 105). Alternatively, or in addition, the electronic processor 200 may receive the operation data periodically or intermittently, such as, e.g., according to a temporal metric (e.g., every five minutes, once a day, etc.), an operational metric (e.g., after producing a specific number of products, after each work cycle, etc.), etc. Alternatively, or in addition, the electronic processor 200 may access the operation data from a storage location. For example, the operation data may be stored in the server 110, in the memory 205 of the user device 125, etc. Accordingly, in some configurations, the operation data may be historic operation data for the industrial system 105 (or component(s) included therein).

The electronic processor 200 may execute the application 220 for the industrial system 105 (at block 910). In some configurations, the electronic processor 200 may execute the application 220 in response to receiving a request to launch (or execute) the application 220. For example, the electronic processor 200 may receive a request initiated by a user to launch (or execute) the application 220. In some configurations, the electronic processor 200 may interact with the server 110 as part of executing the application 220. For example, as noted herein, the server 110 may host or otherwise provide at least one industrial system service or platform (e.g., a process monitoring and supervisory control service). Accordingly, in some configurations, the server 110 may be associated with an industrial system service, such as, e.g., an industrial system service provided by the application 220. For example, in some configurations, the electronic processor 200 may interact with the server 110 to, e.g., access data associated with executing the application 220 (e.g., application specific data, operation data, etc.), access the application 220 (or functionality provided thereby), etc.

In some configurations, the electronic processor 200 may determine a display parameter for a graphic display window of the industrial system 105 (at block 915). As noted herein, the application 220 may provide one or more graphic displays (e.g., graphic display windows) that provide information (e.g., the operation data received at block 905) associated with the industrial system 105 (or component(s) included therein). As described in greater detail herein, a graphic display window may include a graphical representation or visualization of data (e.g., the operation data received at block 905) for the industrial system 105 (or component(s) included therein). For example, a graphic display window may provide a graphical representation of an overview of the industrial system 105 (e.g., as illustrated in FIG. 3), a process performed by the industrial system 105 (e.g., as illustrated in FIG. 4), a component status or other component specific information (e.g., as illustrated in FIG. 5), etc. As also noted herein, the graphic display window may include a set of components or portions. For example, as illustrated in FIGS. 3-5, a graphic display window may include a header portion (e.g., the header portion 305 of FIG. 3) and a content portion (e.g., the content portion 310 of FIG. 3). As described in greater detail herein, the header portion may be a menu bar including a set of graphic control elements for controlling a corresponding graphic display (e.g., graphic display window). Alternatively, or in addition, the header portion may be a title bar including a title or other information for a corresponding graphic display (e.g., graphic display window). Accordingly, the header portion may be a control portion (e.g., a toolbar, a menu bar, a taskbar, a navigation bar, etc.).

In some configurations, the display parameter may be a display parameter for the header portion of the graphic display window. Alternatively, or in addition, in some configurations, the display parameter may be a display parameter for another portion or component of the graphic display window, such as, e.g., the content portion. The display parameter may include an alignment or position for a component or portion of the graphic display window. For instance, the display parameter may define or establish where a component or portion of the graphic display window is aligned or positioned within, e.g., a corresponding display frame of the graphic display window. In some configurations, the display parameter may be a position included in the corresponding display frame, such as, e.g., a top position, a bottom position, a first side position (e.g., a left side), a second side position (e.g., a right side), etc. Accordingly, in some configurations, the display parameter may be a fixed display parameter.

In some configurations, the electronic processor 200 may determine the display parameter based on a user profile. For instance, in some configurations, a user of the application 220 may be associated with a user profile. The user profile may include a set of preset or predefined user preferences or settings, including, e.g., the display parameter. Accordingly, in some configurations, the electronic processor 200 may determine (or otherwise identify) a user of the application 220 (e.g., based on an authentication or authorization process, biometric identification process, etc.). After determining the user of the application 220, the electronic processor 200 may access a user profile for that user and determine user preferences or settings for the application 220 (including, e.g., the display parameter) such that, when the electronic processor 200 executes the application 220, the application 220 may be executed pursuant to those user preferences or settings. Although not illustrated, the user profile (or user preferences or settings, including the display parameter) may be stored locally in the memory 205 of the user device 110 or remotely, such as, e.g., at the server 110, such that the user profile (or user preferences or settings, including the display parameter) is accessible by the electronic processor 200.

Accordingly, the display parameter for the graphic display window may be a docking parameter (or alignment) for a header portion of the graphic display window. As such, in some configurations, the display parameter may include a docking location, where the docking location is included within (or limited to) a corresponding display frame of the graphic display (e.g., graphic display window), such that the header portion of the graphic display window, when docked, is maintained within the corresponding display frame (e.g., as opposed to the HMI-client frame, across multiple display devices or areas).

As illustrated in FIG. 9, the electronic processor 200 may determine, based on the display parameter, an arrangement for the graphic display window (at block 920). An arrangement for the graphic display window may include a layout of components included in the graphic display window, sizing (or resolution) of the components included in the graphic display window, etc. For example, when the graphic display window includes the header portion and the content portion, the arrangement may specify where, within the corresponding display frame, the header portion and the content portion is positioned as well as a size of the content portion such that each portion is maintained within the corresponding display frame. For instance, a size of the content portion (or another portion of the graphic display window) may vary depending on where the header portion is positioned within the display frame.

In some configurations, the electronic processor 200 may access or otherwise utilize the graphic display mapping 225 to determine the arrangement. For instance, in some configurations, the electronic processor 200 may identify a relevant display frame within the graphic display mapping 225. The electronic processor 200 may then determine whether the display frame is configured (e.g., whether the associated graphic display window is associated with a set of display parameters). When the display frame is configured, the electronic processor 200 may then retrieve the associated display parameters and determine the arrangement for the graphic display window based on those display parameters.

In some configurations, the electronic processor 200 determines the arrangement such two or more components of the graphic display window do not overlap with each other. For example, the electronic processor 200 may determine the arrangement such that the header portion and the content portion do not overlap. Therefore, in some instances, the electronic processor 200 may re-size the content portion based on an alignment or position (e.g., the display parameter) of the header portion.

In some configurations, as part of determining the arrangement, the electronic processor 200 may determine a region of the display frame for the content portion (e.g., a region in which the content portion of the graphic display window may be displayed). Determining the region for the content portion may include determining a size (or resolution) for the content portion, a position of the content portion, etc. based at least in part on the alignment (or display parameter) of the header portion. For instance, in some configurations, the electronic processor 200 may determine the region of the display frame for the content portion based on a total resolution of the display frame (e.g., a total displayable area of the display frame), a resolution of the header (or control) portion (e.g., a size or resolution of the header portion), the display parameter (or alignment) of the header (or control) portion, etc. For example, the region of the display frame for the content portion may be a remaining portion of the display area of the display frame (e.g., a portion not occupied or used to display the header portion). Accordingly, in some configurations, the electronic processor 200 may determine the arrangement by determining how the header portion and the content portion are positioned or arranged within the corresponding graphic frame.

In some configurations, the electronic processor 200 may determine the arrangement for the graphic display window by determining, based on resolution data associated with the multi-display HMI environment, a total resolution of a display area provided by the multi-display HMI environment (e.g., a total or available display area provided by or included in the multi-display HMI environment). The electronic processor 200 may then determine a number of display frames of the multi-display HMI environment (e.g., a total number of display frames or a count thereof). In some instances, the electronic processor 200 may also determine one or more parameters of the display frames (e.g., a size of the display frame, a shape of the display frame, etc.). Based on the total resolution and the number of display frames (including other parameters of the display frames), the electronic processor 200 may determine a resolution for the corresponding display frame (e.g., an available display area for the corresponding display frame). The electronic processor 200 may then determine the arrangement for the graphic display window based on the resolution of the corresponding display frame, such that, e.g., the components of the graphic display window are maintained within the corresponding display frame.

As illustrated in FIG. 9, the electronic processor 200 may then generate, based on the arrangement, the graphic display window (at block 925). The electronic processor 200 may generate the graphic display window such that the graphic display window includes at least a portion of the operation data (e.g., as received at block 905), where that portion of the operation data may be relevant to or associated with a feature or attribute of the industrial system 105 that is being provided by the graphic display window. For example, when the graphic display window is for a process of the industrial system 105, the operation data included in the graphic display window may include operation data associated with that process of the industrial system 105. In some configurations, the graphic display window includes an interactive representation of data for the industrial system.

The electronic processor 200 may generate the graphic display window such that the header portion of the graphic display window is maintained within the corresponding display frame. For instance, the electronic processor 200 may generate the graphic display window with the header portion docked (or otherwise positioned) with respect to the corresponding display frame (as specified by the display parameter or alignment determined at block 915). In some configurations, the electronic processor 200 may generate the graphic display window such that one or more portions (or components) of the graphic display window is maintained within the corresponding display frame.

The electronic processor 200 may display the graphic display window (at block 930). In some configurations, the electronic processor 200 may transmit the graphic display window to a display device 130 for display to a user. In response to receiving the display device 130, the display device 130 may display the graphic display window to the user. In some configurations, the graphic display window is displayed within a display area (or a portion thereof) of the display device 130.

In some configurations, the electronic processor 200 may also display the application 220 (e.g., as a GUI or interface of the application 220) using the multi-display HMI environment. For instance, the electronic processor 200 may display the application 220 across multiple display devices 130 (e.g., within the HMI-client frame) while the graphic display window, including the header portion, is maintained, or restricted, to the corresponding display frame for the graphic display window.

Figure 10:
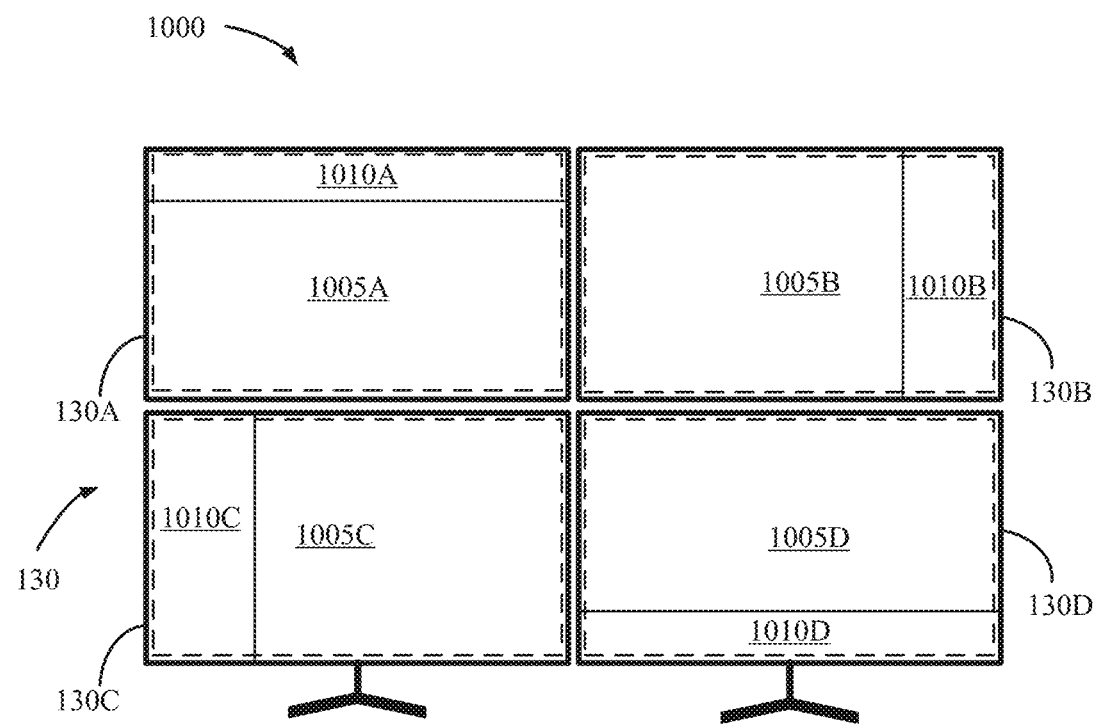
FIG. 10 illustrates an example multi-display HMI environment with docked header portions according to some configurations.

For example, FIG. 10 illustrates an example multi-display HMI environment 1000 (e.g., the multi-display HMI environment 120) with header portions docked to corresponding display frames according to some configurations. As illustrated in FIG. 10, the multi-display HMI environment 1000 includes four display devices 130 (e.g., a first display device 130A, a second display device 130B, a third display device 130C, and a fourth display device 130D). In the example illustrated in FIG. 10, each display device 130 is associated with a display frame. For example, the first display device 130A is associated with a first display frame 1005A, the second display device 130B is associated with a second display frame 1005B, the third display device 130C is associated with a third display frame 1005C, and the fourth display device 130D is associated with a fourth display frame 1005D. However, in some configurations, the display frame(s) may be a portion of a display device 130 such that a single display device 130 may include multiple display frame(s). As illustrated in FIG. 10, a first header portion 1010A for a first graphic display window is positioned at a top position within the first display frame 1005A, a second header portion 1010B for a second graphic display window is positioned at a right-side position within the second display frame 1005B, a third header portion 1010C for a third graphic display window is positioned at a left-side position within the third display frame 1005C, and a fourth header portion 1010D for a fourth graphic display window is positioned at a bottom position within the fourth display frame 1005D. Accordingly, in the example illustrated in FIG. 10, each header portion 1010A-1010D is docked (or positioned) within a display frame of a corresponding graphic display window.

In some configurations the electronic processor 200 may repeat one or more operations of the method 900 (e.g., blocks 915-930). For instance, in some configurations, the electronic processor 200 may repeat one or more operations of the method 900 for one or more additional graphic display windows provided by the application 220 (e.g., a second graphic display window, a third graphic display window, etc.). For instance, the electronic processor 200 may determine a second display parameter for a second portion of a second graphic display window of the plurality of graphic displays (e.g., as similarly described above with respect to block 915). The electronic processor 220 may also determine, based on the second display parameter, a second arrangement for the second graphic display window within a second display frame for the second graphic display (e.g., as similarly described above with respect to block 920). The electronic processor 200 may also generate, based on the second arrangement, the second graphic display window including at least a second portion of the operation data of the industrial system (e.g., as similarly described above with respect to block 925) and display, via the second display device of the plurality of display devices, the second graphic display window within the second display frame (e.g., as similarly described above with respect to block 930), where the second portion is maintained within the second display frame.

In some configurations, the electronic processor 220 may receive, as a user interaction with the application 220, an adjustment to the display parameter (or alignment) for the header (or control) portion of the graphic display window. For example, the adjustment may include a user changing the docking position for the header portion from a top portion to a bottom portion of the corresponding graphic frame window. In response to receiving the adjustment, the electronic processor 200 may determine an adjusted arrangement of the graphic display window based on the adjustment (e.g., as similarly described with respect to block 920 of FIG. 9). The electronic processor 200 may generate and display the adjusted graphic display window based on the adjusted arrangement with the display device 130 (e.g., as similarly described with respect to blocks 925-930 of FIG. 9).

Figure 11:
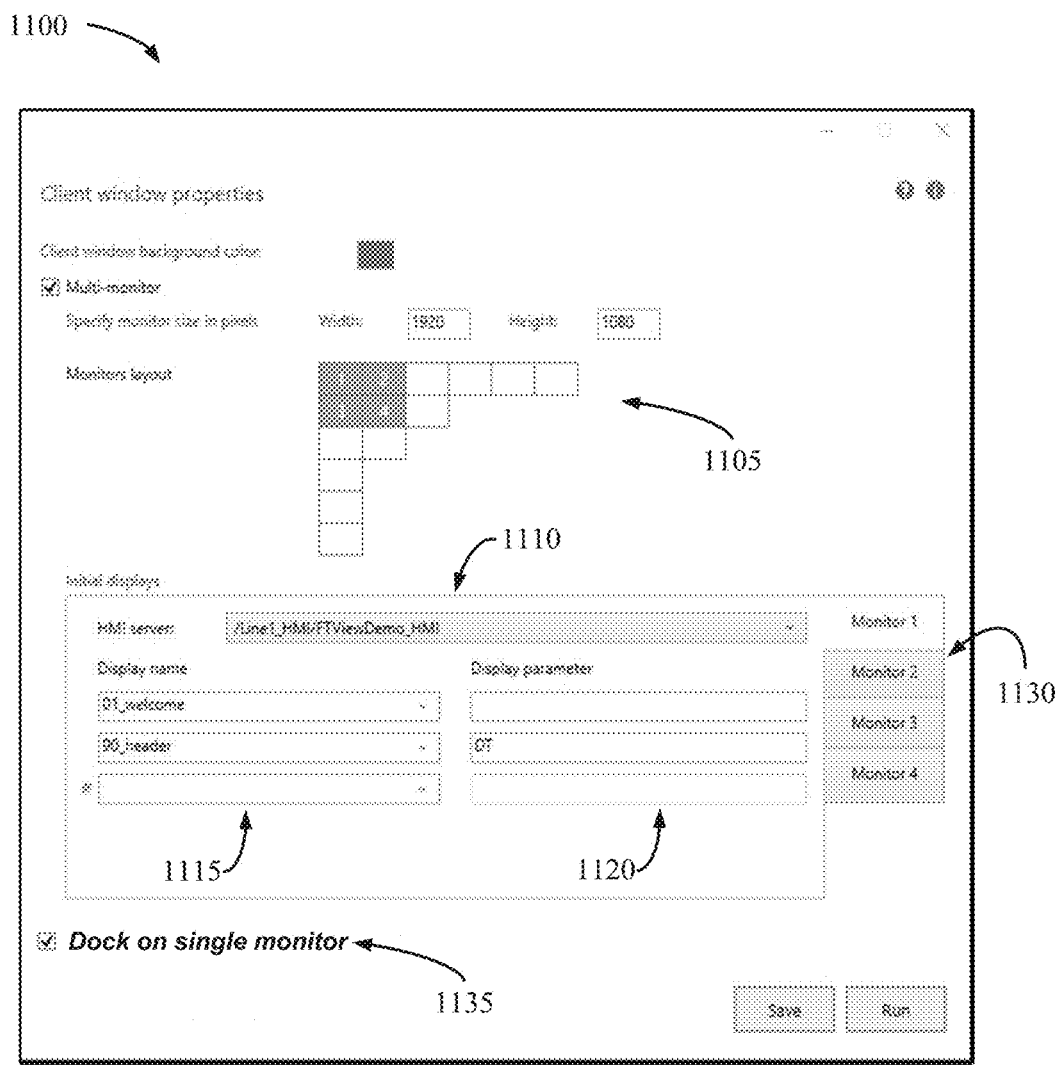
FIG. 11 illustrates an example user interface according to some configurations.

FIG. 11 is an example user interface (e.g., a GUI) 1100 for adjusting a display parameter according to some configurations. A user may interact with the user interface 1100 to set one or more display parameters or settings associated with the multi-display HMI environment (e.g., the multi-display HMI environment 120) via, e.g., the application 220. In some configurations, a user may interact with the user interface 1100 as part of setting up predefined display parameters (e.g., as part of a user profile for that user). Alternatively, or in addition, a user may interact with the user interface 1100 as part of adjusting or altering a display parameter (e.g., while the user is interacting with the multi-display HMI environment 120 to monitor processes and provide supervisory control for the industrial system 105).

As illustrated in FIG. 11, the user interface 1100 includes a layout portion 1105. A user may interact with the layout portion 1105 to designate or define a number of display devices included in the multi-display HMI environment 120, a layout of the display devices included in the multi-display HMI environment 120, etc. The user interface 1100 may also include a displays portion 1110. The displays portion 1110 may include one or more GUI control elements, including, e.g., drop-down menus, text fields, radio buttons, check boxes, etc. As illustrated in the example of FIG. 11, the displays portion 1110 includes a series of input control elements 1115 that a user may interact with by selecting a graphic display window. The user may also select or provide a corresponding display parameter for a selected graphic display window using another series of input control elements 1120. For example, a user may interact with the series of input control elements 1120 in order to designate an alignment or position of a header portion. The user interface 1100 may include a displays portion 1110 for each display device included in the multi-display HMI environment 120. For instance, a user may select a display device from a listing of display devices (e.g., represented in FIG. 11 as a set of tabs 1130, where each tab is associated with a display device of the multi-display HMI environment 120). Based on which display device is selected by the user, a corresponding displays portion 1110 may be provided via the user interface 1100 to the user, such that a user may select one or more graphic display windows (e.g., via interaction with the series of input control elements 1115), corresponding display parameters (e.g., via interaction with the series of input control elements 1120), etc. for the selected display device. The user interface 1100 may also include a GUI control element 1135 for enabling a docking function that facilitates docking a header portion of a graphic display window such that the header portion, when docked, is maintained within the corresponding graphic display frame.

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system of controlling graphic displays within a multi-display human machine interface ("HMI") environment for industrial systems, the system comprising:
   a plurality of display devices configured to provide, within the multi-display HMI environment, an HMI-client application configured to provide a plurality of graphic display user interfaces for an industrial system; and
   one or more electronic processors communicatively coupled to the plurality of display devices and configured to:
      receive operation data of the industrial system;
      execute the HMI-client application for the industrial system;
      determine a first display parameter for a first portion of a first graphic display user interface of the plurality of graphic display user interfaces, the first portion to present a plurality of control elements associated with one or more attributes of the industrial system, the first graphic display user interface to include a second portion to present first content related to operation of the industrial system;
      determine, based on the first display parameter, a first arrangement of the first portion and the second portion such that the first portion and the second portion are maintained within a first display frame of the first graphic display user interface, wherein the first arrangement defines a first position of the first portion within the first display frame and a second position of the second portion within the first display frame to indicate an association between the first portion and the second portion such that interaction with one or more control elements of the plurality of control elements causes the one or more attributes of the industrial system to be presented within a content portion;
      generate, based on the first arrangement, the first graphic display user interface to include the first portion and the second portion, the second portion to include at least a first portion of the operation data of the industrial system as the first content related to operation of the industrial system; and display, via a first display device of the plurality of display devices, the first graphic display user interface within the first display frame.

2. The system of claim 1, wherein the first display parameter is a fixed position within the first display frame, the fixed position including a top position, a bottom position, a first side position, or a second side position, and wherein the first portion is maintained at the fixed position within the first display frame.

3. The system of claim 1, wherein the one or more electronic processors are configured to:

display the HMI-client application across the first display device and a second display device of the plurality of display devices.

4. The system of claim 3, wherein the one or more electronic processors are configured to:

determine a second display parameter for a third portion of a second graphic display user interface of the plurality of graphic display user interfaces, the third portion to present a second plurality of control elements associated with one or more second attributes of the industrial system, the second graphic display user interface to include a fourth portion to present second content related to operation of the industrial system;

determine, based on the second display parameter, a second arrangement of the third portion and the fourth portion such that the third portion and the fourth portion are maintained within a second display frame of the second graphic display user interface, wherein the second arrangement defines a third position of the third portion within the second display frame and a fourth position of the fourth portion within the second display frame to indicate an association between the third portion and the fourth portion such that interaction with one or more control elements of the second plurality of control elements causes the one or more second attributes of the industrial system to be presented within the fourth portion;

generate, based on the second arrangement, the second graphic display user interface to include the third portion and the fourth portion, the fourth portion to include at least a second portion of the operation data of the industrial system as the second content related to operation of the industrial system; and display, via the second display device of the plurality of display devices, the second graphic display user interface within the second display frame.

5. The system of claim 4, wherein the first graphic display user interface provides content related to a first attribute of the industrial system, and wherein the second graphic display user interface provides content related to a second attribute of the industrial system, wherein the second attribute is different from the first attribute.

6. The system of claim 1, wherein the first portion is a menu bar including the plurality of control elements for controlling the first graphic display user interface.

7. The system of claim 1, wherein the first display parameter is a docking location for the first portion relative to the first display frame.

8. A method of controlling graphic displays within a multi-display human machine interface ("HMI") environment for industrial systems, the method comprising:

providing, via a plurality of display devices, the multi-display HMI environment for an HMI-client application, the HMI-client application including a plurality of graphic display user interfaces for an industrial system, wherein an HMI-client frame for displaying the HMI-client application includes a display area of the plurality of display devices and wherein the HMI-client frame includes a corresponding display frame for each graphic display user interface of the plurality of graphic display user interfaces;

executing, with one or more electronic processors, the HMI-client application for the industrial system within the multi-display HMI environment;

determining, with the one or more electronic processors, an alignment for a control portion of a graphic display user interface of the plurality of graphic display user interfaces of the HMI-client application, the control portion presenting a plurality of control elements associated with one or more attributes of the industrial system, the graphic display user interface including a content portion presenting content related to operation of the industrial system;

determining, with the one or more electronic processors, an arrangement of the control portion and the content portion for the graphic display user interface based on the alignment, wherein the arrangement maintains the control portion of the graphic display user interface at a fixed position within a display frame for the graphic display user interface, the arrangement defining a first position of the control portion within the display frame and a second position of the content portion within the display frame to indicate an association between the control portion and the content portion such that interaction with one or more control elements of the plurality of control elements causes the one or more attributes of the industrial system to be presented within the content portion;

generating, with the one or more electronic processors, the graphic display user interface to include the control portion at the first position within the display frame and the content portion at the second position within the display frame based on the arrangement; and transmitting, with the one or more electronic processors, the graphic display user interface for display via a first display device included in the plurality of display devices, wherein the graphic display user interface includes an interactive representation of data for the industrial system.

9. The method of claim 8, wherein determining, with the one or more electronic processors, the arrangement for the graphic display user interface includes:

determining a region of the display frame for the content portion based on a total resolution of the display frame, a resolution of the control portion, and the alignment of the control portion, wherein the content portion provides the interactive representation of data for the industrial system; and determining the arrangement for the graphic display user interface based on the region of the display frame for the content portion.

10. The method of claim 8, wherein determining, with the one or more electronic processors, the arrangement for the graphic display user interface includes:

determining, based on resolution data associated with the multi-display HMI environment, a total resolution of a display area provided by the multi-display HMI environment;

determining a number of display frames of the multi-display HMI environment;
determining, based on the total resolution and the number of display frames, a resolution for the display frame; and
determining the arrangement for the graphic display user interface based on the resolution of the display frame.

11. The method of claim 8, further comprising:
receiving, with the one or more electronic processors, as a user interaction with the HMI-client application, an adjustment to the alignment for the control portion;
responsive to receiving the adjustment to the alignment for the control portion,
  determining, based on the adjustment, an adjusted arrangement of the control portion and the content portion such that the control portion and the content portion are maintained within the display frame of the graphic display user interface, the adjusted arrangement defining a third position of the control portion within the display frame and a fourth position of the content portion within the display frame, wherein the third position of the control portion is different from the first position of the control portion;
  generating, based on the adjusted arrangement, an adjusted graphic display user interface to include the control portion at the third position within the display frame and the content portion at the fourth position within the display frame; and
  displaying, with the first display device of the plurality of display devices, the adjusted graphic display user interface.

12. The method of claim 8, further comprising:
displaying, with the one or more electronic processors, the graphic display user interface on the first display device; and
displaying, with the one or more electronic processors, the HMI-client application across the first display device and a second display device of the plurality of display devices.

13. A non-transitory, computer-readable medium storing instructions that, when executed by one or more electronic processors, perform a set of functions, the set of functions comprising:
  executing, within a multi-display HMI environment including a plurality of display devices, an HMI-client application for an industrial system, the HMI-client application including a plurality of graphic display user interfaces, wherein an HMI-client frame for displaying the HMI-client application includes a display area of the plurality of display devices and wherein the HMI-client frame includes a corresponding display frame for each graphic display user interface of the plurality of graphic display user interfaces;
  determining a display parameter for a header portion of a graphic display user interface of the plurality of graphic display user interfaces, the header portion presenting a plurality of control elements associated with one or more attributes of the industrial system, the graphic display user interface including a content portion presenting content related to operation of the industrial system;
  determining, based on the display parameter, an arrangement of the header portion and the content portion such that the header portion and the content portion are maintained within a display frame of the graphic display user interface, wherein the arrangement defines a first position of the header portion within the display frame and a second position of the content portion within the display frame to indicate an association between the header portion and the content portion such that interaction with one or more control elements of the plurality of control elements causes the one or more attributes of the industrial system to be presented within the content portion;
  generating the graphic display user interface to include the header portion at the first position within the display frame and the content portion at the second position within the display frame based on the arrangement;
  displaying the HMI-client application across the plurality of display devices; and
  displaying the graphic display user interface of the HMI-client application within the display frame for the graphic display user interface on a first display device of the plurality of display devices such that the header portion and the content portion are prevented from being displayed on a second display device of the plurality of display devices.

14. The computer-readable medium of claim 13, wherein displaying the graphic display user interface within the display frame includes displaying the graphic display user interface within a display area of the first display device.

15. The computer-readable medium of claim 13, wherein displaying the graphic display user interface within the display frame includes displaying the graphic display user interface within a portion of a display area of the first display device.

16. The computer-readable medium of claim 13, wherein determining the display parameter includes determining a predefined position for the header portion, the predefined position including at least one of a top position, a bottom position, a left position, or a right position.

17. The computer-readable medium of claim 13, further comprising:
  determining a region of the display frame for displaying the content portion based on a total resolution of the display frame, a resolution of the header portion, and the display parameter of the header portion,
  wherein the arrangement is determined based on the region of the display frame for displaying the content portion.

18. The computer-readable medium of claim 13, further comprising:
  determining, based on resolution data associated with the multi-display HMI environment, a total resolution of a display area provided by the multi-display HMI environment;
  determining a number of display frames of the multi-display HMI environment; and
  determining, based on the total resolution and the number of display frames, a resolution for the display frame,
  wherein the arrangement for the graphic display user interface is based on the resolution of the display frame.

19. The computer-readable medium of claim 13, further comprising:
  receiving, as a user interaction with the HMI-client application, an adjustment to the display parameter for the header portion;
  responsive to receiving the adjustment to the display parameter for the header portion,
    determining, based on the adjustment, an adjusted arrangement of the header portion and the content portion such that the header portion and the content portion are maintained within the display frame of the graphic display user interface, the adjusted arrangement defining a third position of the header portion within the display frame and a fourth position of the content portion within the display frame, wherein the third position of the header portion is different from the first position of the header portion;

generating, based on the adjusted arrangement, an adjusted graphic display user interface to include the header portion at the third position within the display frame and the content portion at the fourth position within the display frame; and displaying, with the first display device of the plurality of display devices, the adjusted graphic display user interface.

20. The computer-readable medium of claim 13, further comprising:

determining the display parameter based on a user profile that includes the display parameter as a preset parameter.

\* \* \* \* \*